UNITED STATES PATENT OFFICE.

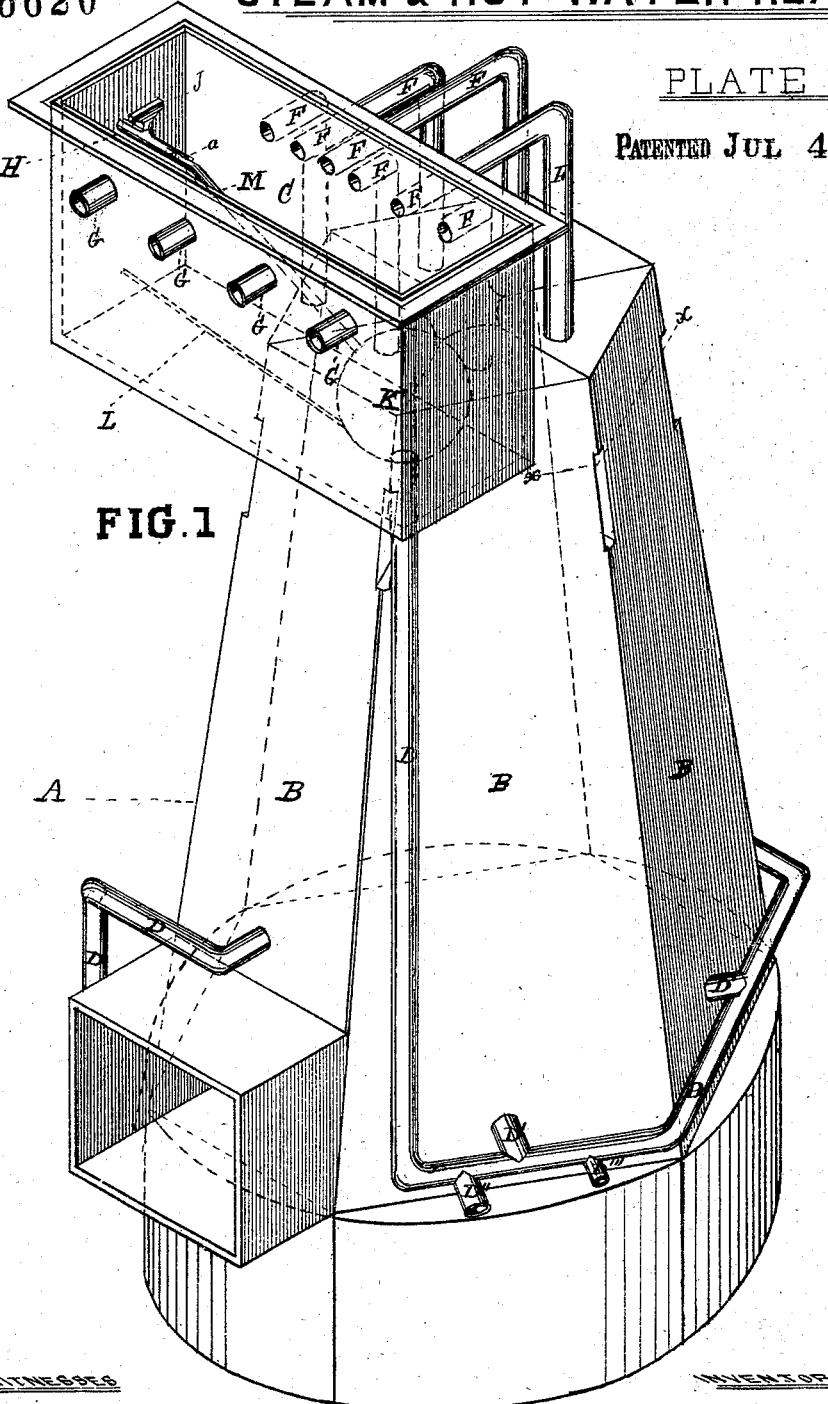

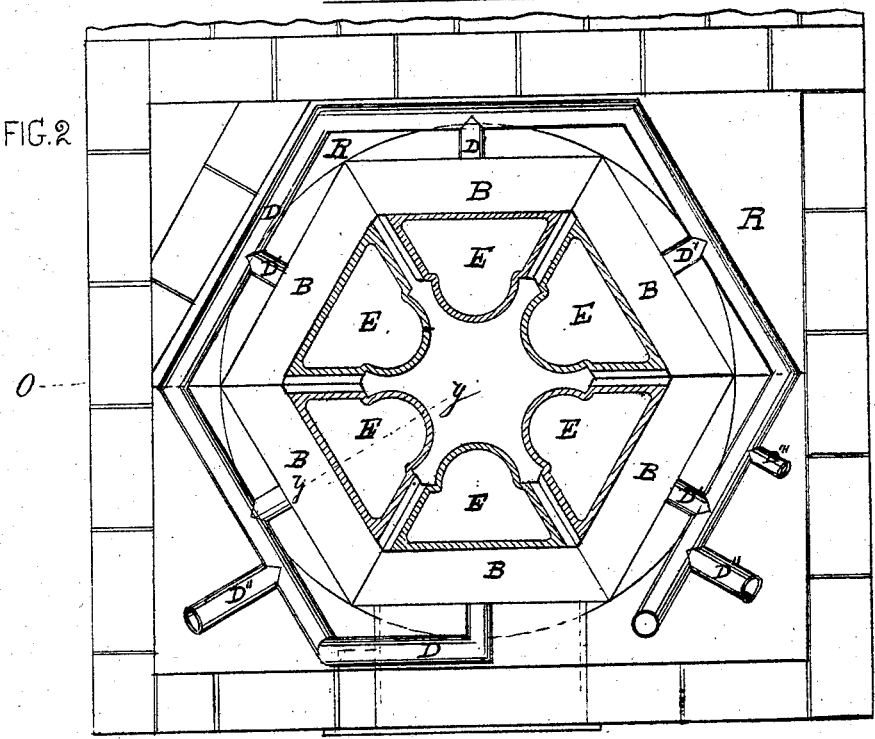
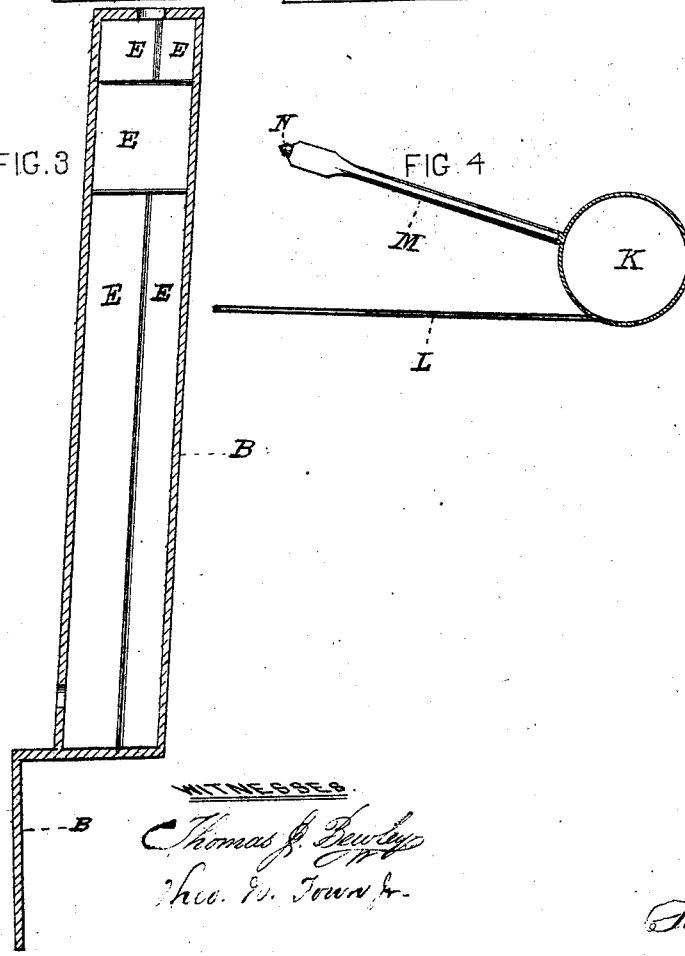

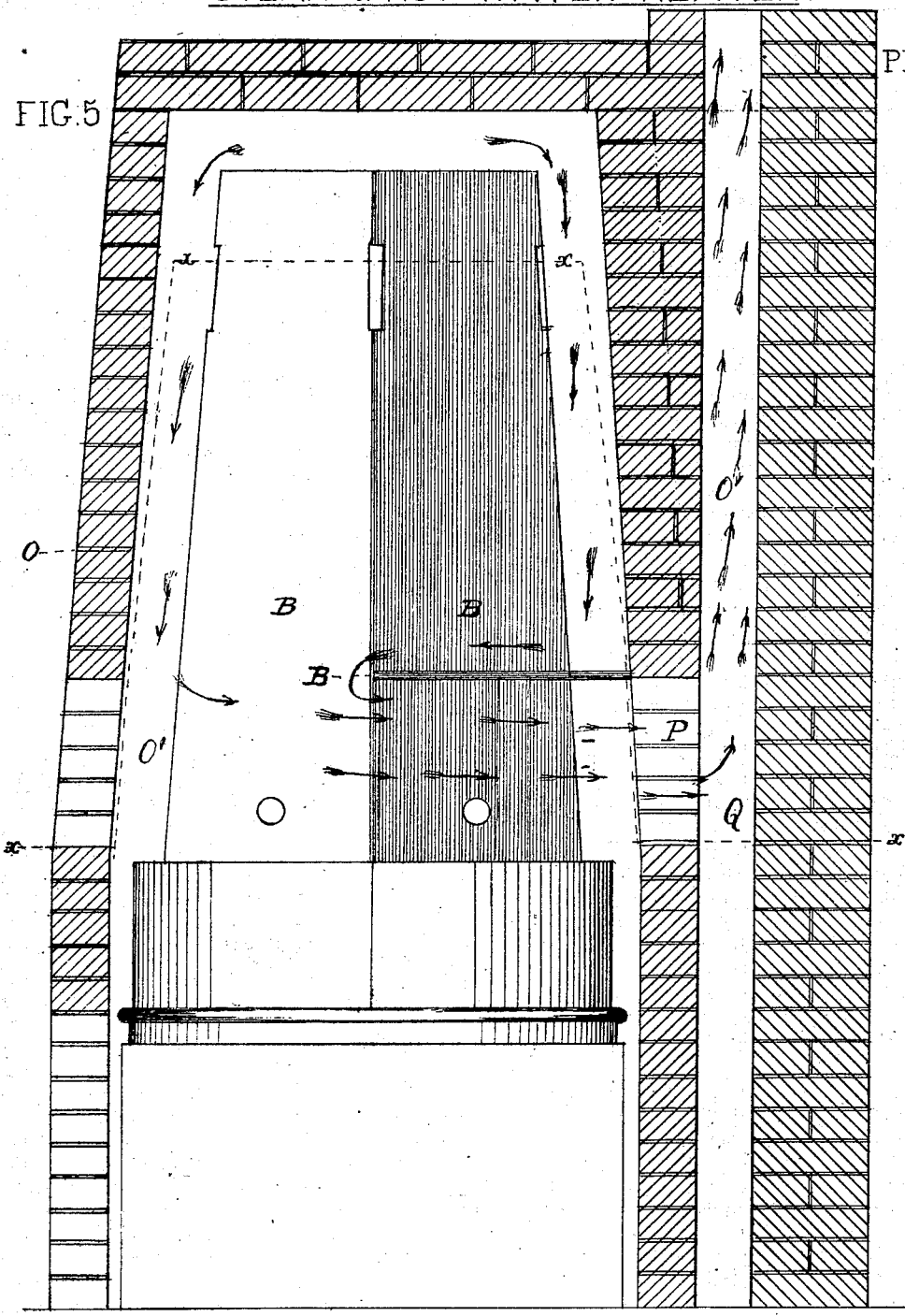

NATHAN MIDDLETON AND STEPHEN MORRIS, OF PHILADELPHIA, PA.

IMPROVEMENT IN HOT-WATER HEATERS.

Specification forming part of Letters Patent No. 116,620, dated July 4, 1871.

*To all whom it may concern:*

Be it known that we, NATHAN MIDDLETON and STEPHEN MORRIS, of the city of Philadelphia and State of Pennsylvania, have invented certain Improvements in Steam and Hot-Water Heaters, of which the following is a specification:

The nature of our invention consists of the following particulars: The fire-chamber is formed of cast-iron staves, the part above the fuel-chamber being hollow to contain water to be heated. The staves are so constructed and arranged as to give conical form to the fire-chamber, so that as the heat ascends it passes more rapidly through the metal for heating the water. The joints between the staves are left slightly open, so that the products of combustion may partially pass through into the external chamber of the heater, formed by brick-work similar to the usual mode of construction. Larger openings are made between the staves, near their upper ends, to increase the upward draught. There is a communication at the lower end of each water-chamber of the staves with a surrounding pipe, which connects by means of a vertical pipe with a water-tank above the heater, whereby the chambers of the staves are kept filled with water. The supply of water in the tank may be regulated by means of a float or other suitable device. If desired, the water-supply pipe may receive the water directly from the street-main in the manner shown in the patent of George H. Sellers, dated October 27, 1868. The top of the chamber of each stave has a connection, by means of a pipe, with the tank above mentioned, into which the hot water or steam ascends and passes, by means of suitable pipes, to the different radiators in the building. The condensed or chilled water is returned by means of other pipes from the radiators to the feed-pipe, and through it to the lower ends of the heating-chambers of the staves, above described.

In the accompanying drawing which makes a part of this specification, Figure 1 is an isometrical view of the improved heater. Fig. 2, plate 2, is a horizontal section at the line *x x* of Figs. 1 and 5. Fig. 3 is a vertical section at the line *y y* of one of the staves, seen in Fig. 2. Fig. 4 is a vertical section of the hollow float K, with the tube L and rod M in connection. Fig. 5, plate 3, is a vertical section of the heater and brick chamber O.

Like letters in all the figures indicate the same parts.

A is a conical fire-chamber. B B B B B B are hollow staves which form said chamber. C is a tank which supplies the chambers E of the staves with water. D is the feed-pipe through which the water passes from the tank to the chambers E of the staves, the upper end of the vertical part of the pipe connecting with the tank, as seen in Fig. 1, and the horizontal part communicating with the lower ends of the chambers by means of the short pipes D', as seen in Figs. 1 and 2. The lower part of the staves forms the fuel-cylinder. The upper part 2 is hollow, as represented in detail in Figs. 2 and 3. The upper ends of the chambers of the staves communicate with the tank C, respectively, by means of the pipes F. A semicircular form is given to the inside of the staves, as seen in Fig. 2, to increase the capacity of the chambers E and also the heating-surfaces of the staves. The cover of the tank is removed in the drawing for the purpose of showing the interior arrangement of the tank. The hot water or steam, as the case may be, is conveyed from the tank C to the radiators by means of suitable pipes G by passing through the pipes F which communicate with the tank and the upper ends of said chambers, as described above, the water ascending into the top of the tank as it becomes heated in the chambers E of the staves, or the steam, as it is generated in said chambers, passing into the tank in the same manner and from thence through said pipes G to the radiators. As the water condenses in the radiators it is returned to the lower ends of the chambers E of the staves through suitable pipes which communicate with the horizontal pipe D at D" D", seen in Fig. 2. The tank C receives the supply of water through the pipe H, which is provided with a stop-cock, J. When desired, the chambers E may be supplied directly from the street-main by the pipe D''' communicating, as seen in Figs. 1 and 2, with the pipe D. The heater is surrounded by an ordinary brick case, O, as seen in Figs. 2 and 5, the upper part of which is of conical shape, corresponding to the shape of that part of the heater, so as to form a uniform space, O', for the passage of the products of combustion around in front of the heater and to the lower part of the same, as indicated by the arrows, whence they escape through the horizontal flue P into the vertical draught-flue or chimney Q, there being a check-plate, R, above the said horizontal flue which prevents the downward draught at the back of the heater.

By means of this mode of the passage of the products of combustion the heat contained in the same is utilized, the greater portion escaping into the space O' and thus serving to heat the outer surfaces of the staves.

What we claim as our invention, and desire to secure by Letters Patent, is—

1. The combination and arrangement of the hollow staves B having water spaces E, the said spaces receiving their supply of water through a suitable feed-pipe or pipes, and having communication with exit hot-water or steam-pipes, substantially as described.

2. The combination and arrangement of the tank C with the chambers E by means of the pipes F, as and for the purpose set forth.

3. The combination and arrangement of the feed-pipe D and short pipes D' with the tank C and the lower ends of the chambers E, substantially in the manner and for the purpose specified.

In testimony that the above is our invention we have hereunto set our hands and affixed our seals this 11th day of April, 1871.

NATHAN MIDDLETON. [L. S.]
STEPHEN MORRIS. [L. S.]

Witnesses:
THOMAS J. BEWLEY,
STEPHEN USTICK.